United States Patent Office 2,983,046
Patented May 9, 1961

2,983,046

DENTAL APPLIANCE

Harvey Jenkins, 200 St. Clair Ave. W., Toronto, Ontario, Canada

Filed Oct. 16, 1958, Ser. No. 767,534

7 Claims. (Cl. 32—14)

This invention relates to an appliance for correcting the alignment of teeth in the upper and lower dental arches, and the position and shape of the jaws. It is an appliance that is worn between the teeth of the upper and lower jaws and becomes active to correct malalignment in teeth through the activity of masticatory muscles and externally applied pressure, both of which result in the application of pressure upon the labial, lingual and occlusal surfaces of malaligned teeth to urge their occlusal surfaces towards an arch shaped ledge of correct contour that extends between the teeth in the upper and lower jaw.

In the past, various devices adapted to be worn between the teeth of the upper and lower jaw have been used to correct malaligned teeth. They have, to my knowledge, been activated through the activity of masticatory, lingual, labial and buccal muscles and have depended for their correcting action to a large extent upon their accurate fit to engage soft tissue or teeth in the mouth. With them it is necessary to take accurate impressions of the soft tissue or teeth in the mouth and carefully fashion the appliance to fit the individual patient.

My appliance is not one that is in use accurately fitted to the patient's mouth and, it does not depend for its action upon engagement with soft tissue. Rather, my appliance has an arched ledge that is disposed between the teeth of the upper and lower dental arches that has a predetermined and more correct arch than the teeth of the patient. Flanges adapted to engage with the labial and lingual sides of the teeth extend from this ledge and in use guide the occlusal surfaces of the malaligned teeth towards the ledge, as the mandible exerts pressure upwardly against the maxilla and/or as external pressure is applied. If all teeth are properly aligned according to the treatment undertaken, the occlusal surfaces will all sit on the arched ledge with uniform pressure.

My appliance has considerable advantages over the prior art. Firstly, it does not have to be accurately fitted to the patient's mouth. Rather, one starts with an arched ledge adapted to receive the occlusal surfaces of the teeth when they are in a corrected dental arch. This ledge does not match the patient's dental arches at the beginning of treatment and its shape is selected by the orthodontist rather than fitted to the patient. The correcting flange means engage only the sides of malaligned teeth and they further are not peculiar to the particular patient's mouth. The device therefore can be mass produced. It is a very simple matter, with a device of this kind, to provide for ready manual adjustment of the shape of the dental arch desired.

Further, since the appliance does not bear on soft tissue it is possible to apply external pressure to it, to a readier degree than one could with an appliance that bears on soft tissue.

The invention and other advantages will be apparent to those skilled in the art after reading the following detailed specification in conjunction with the drawings.

Figure 1:
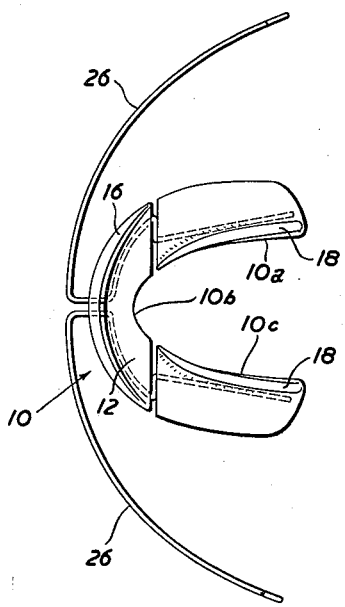
Figure 1 is a view of an appliance according to the invention from the top, illustrating the arched ledge surface normally engaged by the upper teeth.
Figure 2:
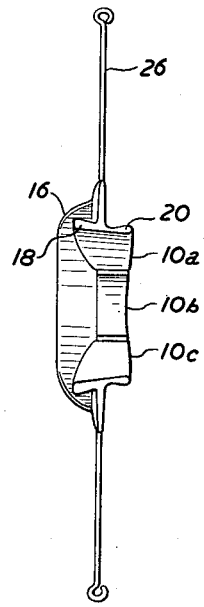
Figure 2 is a side view of the same appliance.
Figure 3:
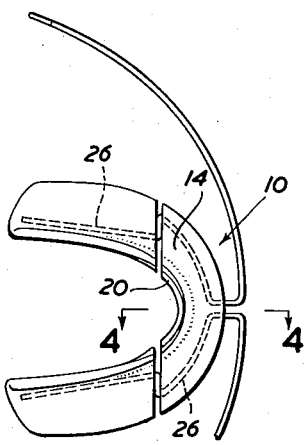
Figure 3 is a view of the same appliance from the underside illustrating the arched ledge surface normally engaged by the teeth of the lower jaw.
Figure 4:
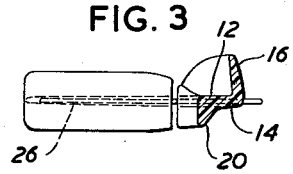
Figure 4 is a view along the line 4—4 of Figure 3.

Referring to the drawings, the appliance comprises a body made from a hard material such as a plastic that has an arched ledge 10 having an upper surface 12 adapted to receive thereon the occlusal surfaces of the teeth in the upper jaw and a lower surface 14 adapted to receive the occlusal surfaces of the teeth in the lower jaw. The contour of the ledge surfaces 12 and 14 is predetermined to receive the occlusal surfaces of the teeth in the upper and lower jaws of a patient when the teeth are properly aligned.

The device, in use, is worn between the teeth of the upper and lower jaws and flange means are provided for urging malaligned teeth onto their respective ledge surface by reason of its contact with the labial and lingual surfaces of malaligned teeth.

The surface 12 of the arched plate 10 has a flange 16 at its forward edge which is adapted to engage with the labial surfaces of the malaligned teeth of the anterior teeth of the upper dental arch and flange means 18 adapted to engage with the lingual side of malaligned teeth of the posterior teeth of the upper dental arch to urge any such malaligned teeth onto the arched surface 12 which has a predetermined and corrected arch, as the appliance is worn between the teeth. The underside 14 of the arch 10 that is engaged by the occlusal sides of the teeth of the mandible has a flange 20 extending therearound to urge the occlusal sides of the malaligned teeth of the lower dental arch onto the surface 14 as the device is worn between the teeth of the upper and lower dental arch.

The arch of the plate 10 is chosen to correct the malaligned condition of the teeth. Due to the pressure on malaligned teeth that is exerted by the flanges, the occlusal surfaces are urged onto the surfaces 12 and 14 and the teeth are thereby aligned in corrected arches.

It will be apparent that, for various conditions of teeth malalignment, different flanges to those shown may be used.

The arch of the plate 10 then, is not made to conform to a patient's malaligned teeth, but it is preformed in the shape of a corrected arch. Thus, the appliance can be made without fitting to the patient's mouth. Adjustment of the arch will, of course, be necessary and I have found that adjustment in this particular appliance can be very readily provided for by making the arch in sections such as the sections 10a, 10b and 10c, joined by means of a wire 26 that is moulded into each of them. Wire 26 can be set by manual adjustment to vary the arch of the device. Thus, with few stock sizes, an orthodontist can readily obtain a device having any desired arch.

The wire 26 has loops at its free ends which can be secured by means of an elastic to provide for extra oral traction when required. The elastic bands 30 may alternately be anchored on a head cap.

In use, the device is worn between the teeth of the upper and lower dental arches and as the patient bites to bring the mandible towards the maxilla, a pressure is exerted on malaligned teeth in the fore and rear directions by the flanges that tend to urge them onto the correct arch of the arched surfaces 12 and 14. Malaligned teeth in the vertical direction are brought to conformity by pressure of the occlusal surfaces on the surfaces 12 and 14 of the ledge. When the teeth are all aligned in three planes they will automatically sit on the surfaces 12 and 14 with even pressure.

Figure 5:
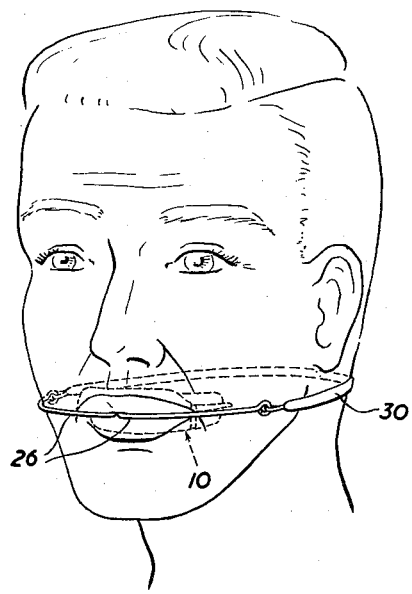
Figure 5 is a view illustrating one manner in which the appliance is used.

The flanges engage only the labial and lingual surfaces of the teeth and do not engage with soft tissue. It is, therefore, possible to apply extra oral traction by means of elastics which are secured to a neck strap or a head cap. In Figure 5, I have indicated elastic strap 30.

This appliance is suited to treat the great multitude of types of orthodontics deformities.

The most common and deforming abnormality is described as angle class II, in which overgrowth of the maxilla and its dental arch in a downward and forward direction is combined with lack of growth of the mandible and its dental arch.

This appliance may be used to control these abnormal growth trends and re-direct growth of maxilla and mandible to a normal shape. The appliance is inserted to fit the upper dental arch by manually adjusting the arch of the appliance in its width factor. The patient is instructed to close the lower jaw in a forward direction to a comfortable position on the appliance. Application of a light cloth head cap and suitable elastics applies an upward and posterior restraining force to the maxillary dental arch, while the mandible is promoted to grow normally downwards and forwards. The dental arches are concomitantly moulded in 3 dimensions to the correct shape.

Time of wear of the appliance is for a period of 10 to 12 hours per diem while at home.

Period of correction is from one to two years for severe deformities.

An angle class III orthodontics deformity, though not common, presents a difficult problem for correction. It features the converse deformity from a class II malocclusion just described, for a small maxilla is associated with a large mandible. The application of this appliance is also reversed with the labial flange 16 engaging in front of the lower teeth. Posterior force is then applied to the mandibular dental arch by elastics attached to a cervical or neck strap. The act of closure and the holding of the jaws closed, applies expanding forces to the maxillary dental arch through engagement of the inner flange with the sloping lingual surfaces of the maxillary teeth.

By following these principles the multitude of types of deformity included between a class II and a class III malocclusion are treated with this appliance.

Teeth which are markedly rotated, requiring application of individual bands for correction, may have this treatment applied in conjunction with the more extensive treatment by my appliance. This is made possible by the loose fit of the flanges admitting bands to be used at the same time.

Treatment may be applied for a child at the most suitable age, without limitations being imposed on the treatment plan by factors such as—number of teeth present, disease of teeth or degree of eruption of teeth, all of which are limitations on the use of many appliances.

If extraction of teeth is required in the treatment plan, this may be executed at any time without interfering with appliance efficiency.

Abnormal habits involving tongue, fingers or sucking of objects, are automatically controlled during treatment by virtue of the design of the appliance.

The appliance requires little adjustment, if any. Therefore the limitation of frequent visits is not imposed on the treatment plan. It is recommended that three-monthly inspections be carried out to observe patient cooperation, need for adjustment, change in elastic pressure required, and examination of oral health and hygiene. These inspections need not be performed specifically by the orthodontist.

I claim:

1. A dental appliance comprising a body having an arched plate, said plate having an upper and a lower bearing surface and being arched to receive thereon the occlusal surfaces of the teeth in the upper and lower jaws when said teeth are in predetermined arches, flange means extending from said plate and being adapted to solely engage with the labial and lingual surfaces of malaligned teeth to urge the occlusal surfaces of malaligned teeth onto the said plate, said flange means including a first flange extending from one of said bearing surfaces of said plate that is adapted to engage with the labial surfaces of malaligned teeth of only the anterior teeth of a dental arch and flanges extending from the same bearing surface of said plate as said first flange adapted to engage with the lingual side of malaligned teeth of only the posterior teeth of a dental arch.

2. A dental appliance as claimed in claim 1 in which the contour of the arch of said arched plate can be manually adjusted.

3. A dental appliance comprising a body having an arched plate, said plate having an upper and a lower bearing surface and being arched to receive thereon the occlusal surfaces of the teeth in the upper and lower jaws when said teeth are in predetermined arches, flange means extending from said plate and being adapted to solely engage with the labial and lingual surfaces of malaligned teeth to urge the occlusal surfaces of malaligned teeth onto the said plate, said flange means including a first flange extending from the upper one of said bearing surfaces of said plate adapted to engage with the labial surfaces of malaligned teeth of only the anterior teeth of the upper dental arch, flanges extending from the same bearing surface of said plate as said first flange, adapted to engage with the lingual side of malaligned teeth of only the posterior teeth in the upper dental arch and flange means extending from the lower one of said bearing surfaces of said plate that is adapted to engage with the lingual side of all teeth in the lower dental arch.

4. A dental appliance as claimed in claim 3 in which the contour of the arch of said arched plate can be manually adjusted.

5. A dental appliance comprising a body having an arched plate, said plate having an upper and a lower bearing surface and being arched to receive thereon the occlusal surfaces of the teeth in the upper and lower jaws when said teeth are in predetermined arches, flange means extending from said plate and being adapted to solely engage with the labial and lingual surfaces of malaligned teeth to urge the occlusal surfaces of malaligned teeth onto the said plate, said flange means including a first flange extending from one of said bearing surfaces of said plate that is adapted to engage with the labial surfaces of malaligned teeth of only the anterior teeth of a dental arch, flanges extending from the same bearing surface of said plate as said first flange adapted to engage with the lingual side of malaligned teeth of only the posterior teeth of a dental arch and flange means extending from the other one of said bearing surfaces of said plate.

6. A dental appliance as claimed in claim 5 in which the contour of the arch of said arched plate can be manually adjusted.

7. A dental appliance comprising a body having an arched plate, said plate having an upper and a lower bearing surface and being arched to receive thereon the occlusal surfaces of the teeth in the upper and lower jaws when said teeth are in predetermined arches, flange means extending from said plate and being adapted to solely engage with the labial and lingual surfaces of malaligned teeth to urge the occlusal surfaces of malaligned teeth onto the said plate, said flange means including a first flange extending from one of said bearing surfaces of said plate that is adapted to engage with the labial surfaces of malaligned teeth of only the anterior teeth of a dental arch, flanges extending from the same bearing surface of said plate as said first flange adapted to engage with the lingual side of malaligned teeth of only the posterior teeth of a dental arch and flange means extending from the other one of said bearing surfaces of said plate adapted to engage with the lingual side of all teeth of a dental arch.

References Cited in the file of this patent

UNITED STATES PATENTS

| | | |
|---|---|---|
| 2,467,432 | Kesling | Apr. 19, 1949 |
| 2,822,612 | Strickler | Feb. 11, 1958 |